Nov. 21, 1967  P. JERROLD-JONES ET AL  3,354,069

ELECTRODE COMPONENT AND METHOD OF MAKING THE SAME

Filed March 10, 1964

INVENTORS
PAUL JERROLD-JONES
MAURICE L. DEUSHANE
BY
*Thomas L. Peterson*

United States Patent Office 3,354,069
Patented Nov. 21, 1967

3,354,069
ELECTRODE COMPONENT AND METHOD
OF MAKING THE SAME
Paul Jerrold-Jones, Claremont, and Maurice L. Deushane,
Whittier, Calif., assignors to Beckman Instruments Inc.,
a corporation of California
Filed Mar. 10, 1964, Ser. No. 350,821
11 Claims. (Cl. 204—195)

ABSTRACT OF THE DISCLOSURE

An electrode component formed of a metal and a sparingly soluble salt of the metal for measuring electromotive force. The component is formed by compressing the metal in powdered form into a porous unitary body and then filling the interstices of the body with the melted salt so as to provide a completely nonporous electrode.

---

This invention relates generally to an electrode component for the measurement of electromotive force and, more particularly, to an electrode component formed of a metal and a salt of the metal that will produce an electromotive force when inserted into a salt solution and the method of making such an electrode component.

In the application of the type of electrode to which this invention pertains, the salt is usually only sparingly soluble and is in equilibrium with a saturated solution, the solution forming a portion of the complete electrode system. The voltage generated by the electrode component when inserted into the solution is a function of the concentration of ions in the solution of the species formed by the salt.

Half cells containing this type of electrode component are widely used in reference electrodes for pH measuring equipment. Such an electrode component may also be used as the internal electrode of a half cell having a glass bulbous membrane as an indicating electrode for the measurement of hydrogen ion concentration of pH, such an assembly being known as the "glass electrode." Electrode components of the invention may also be used by direct immersion in a sample to determine the amount of particular kinds of ions present in the sample. For example, a silver-silver chloride electrode as indicated above, when placed in a solution of an unknown chloride ion content develops a potential indicative of the amount of chloride ion present. Such an electrode may also be used to measure silver ion concentration. In such applications, the electrode component and the sample solution taken together may be considered to comprise a half cell. These electrode components also have other uses, such as reference standards in corrosion studies and for direct current conductance measurements.

Electrode components manufactured by conventional methods often deteriorate seriously during use or develop erratic behavior. These electrode components usually comprise a relatively thin layer of the salt on a supporting surface of the metal and provide only a limited bulk of electrochemically active material. Thin layers are particularly susceptible to physical deterioration upon temperature cycling, due largely to the different coefficients of expansion of the metal and the salt. The limited active amounts of salt will in time go completely into solution, particularly when exposed constantly to fresh solutions, resulting in a useless electrode. Also, the conventional salt layers of these electrodes are porous or granular in some degree, and thus form pockets of solution, adjoining the metal, which cannot equilibrate rapidly in ionic composition with the main body of solution. Since fundamentally the developed potential is determined by the concentration of ions directly contacting the metal, this results in slow equilibration of the electrode potential when the composition of the main body of solution is changed or when the temperature changes.

An improved electrode and method for making the same is described in U.S. Patent No. 3,111,478 to Watanabe, assigned to the same assignee as the present application. This patent describes an electrode component formed of a powdered metal and powdered salt of the metal which is formed by mixing the powdered metal and powdered salt and compressing the mixture into a substantially nonporous integral mass. Although this electrode component overcomes most of the disadvantages of the conventional electrodes, it is somewhat expensive and difficult to form by mass production techniques because high pressures are required to compress the powdered metal and powdered salt of the metal into a nonporous unitary body.

It is the principal object of the present invention to overcome the disadvantages of the conventional electrode components and to improve the electrode component described in the aforementioned Watanabe patent.

Another object of the invention is to provide an improved electrode component which is extremely rugged, resistant to mechanical influences and to temperature cycling, and has high electrical stability.

A further object of the invention is to provide an electrode component formed of a metal and a salt of the metal which is completely nonporous and thus not subject to contamination.

Still a further object of the invention is to provide an electrode component which has a large amount of active material and one in which the salt is dispersed uniformly throughout the body of the electrode component so that the component will equilibrate very rapidly with the body of solution in which the component is immersed.

Another object of the invention is to provide a simple and inexpensive method of manufacturing the electrode component of the invention.

According to the principal aspect of the present invention, an electrode component is formed by first compressing a powdered metal into a porous unitary body and then filling the interstices of the porous body with a melted salt of said metal so that when the body is cooled the melted salt solidifies into a solid state. By this method there is provided a rugged, nonporous electrode component comprised of a porous body of compressed powdered metal and a molten salt of said metal in solid state filling the interstices of the body. The term "molten" used in this description and in the following claims refers to a substance which is first melted or fused and then solidified into a solid state while the term "melted" refers to a substance which is in a fluid state.

According to another aspect of the invention, it has been found that the porous unitary body of compressed powdered metal may have its interstices readily filled with a melted salt of the metal by immersing the body in a bath of the melted salt and creating a vacuum about the body thereby withdrawing all the gas from the interstices of the body. Consequently, upon return to atmospheric conditions, the melted salt is driven into the interstices of the porous body thereby ensuring a complete filling thereof with the melted salt and, therefore, providing an electrode component which is completely nonporous, extremely rugged, has high electrical stability and reaches equilibrium with a salt solution very rapidly.

Other objects, aspects and advantages will become apparent from the following description taken in connection with the accompanying drawing wherein.

The particular materials used in the electrode component of the invention are not pertinent to the invention, the choice of metals and metal salts being limited by those which will work electrochemically in the particular application to produce an electromotive force indicative of the condition being investigated. The same materials which are used in conventional electrode components may be utilized except with the obvious limitation, that the metal salt must be capable of being melted. Silver and silver chloride are found to form one of the most useful metal-metal salt combinations and to behave excellently for the method of the invention. Other silver-silver halide electrodes are in use, for example, the iodide and the bromide electrodes, though not as widespread as the chloride type. Also, silver-silver sulfide electrodes have found some use. Examples of combinations comprising other metals which may be found useful are copper-copper sulfide and bismuth-bismuth fluoride. Hence, the invention is applicable to any of the metal-metal salt combinations used in electrochamical electrodes if the salts are meltable.

In a preferred method of making the electrode component of the invention, herein exemplified as a silver-silver chloride electrode, a quantity of silver metal powder, preferably precipitated grade which has a very fine particle size, is compacted or pressure molded to produce a coherent unitary porous body. A simple hand arbor press has been used for this purpose which has a 50–75 foot-pound force. Conventional dies may be used since the pressures required to form the porous body of compressed powdered silver need only be sufficient to maintain the body in a unitary form. Besides using a press or arbor, unitary bodies of powdered silver have been formed by merely inserting the powdered silver into the end of a glass test tube and compacting the silver with a glass rod. When a die and press are used to compact the powdered silver, it is preferable that the parts which come into contact with the silver be formed of an inert material which will not contaminate the electrode component. Rhodium plated parts are suitable for silver-silver chloride electrodes because of the chemical inertness of the rhodium.

The amount of pressure used to compact the powdered metal is also dependent upon the ratio of silver to silver chloride that is desired in the final electrode component. Obviously, the greater pressure that is used in compressing the powdered silver, the less amount of melted silver chloride will be able to fill the interstices of the porous silver body. Preferably, the ratios of silver to silver chloride in the final electrode component should be 30–70 to 70–30 by weight. However, ratios ranging from 20–80 and 80–20 would also be suitable for most electrochemical applications. However, these limits are not absolute.

Figure 1:
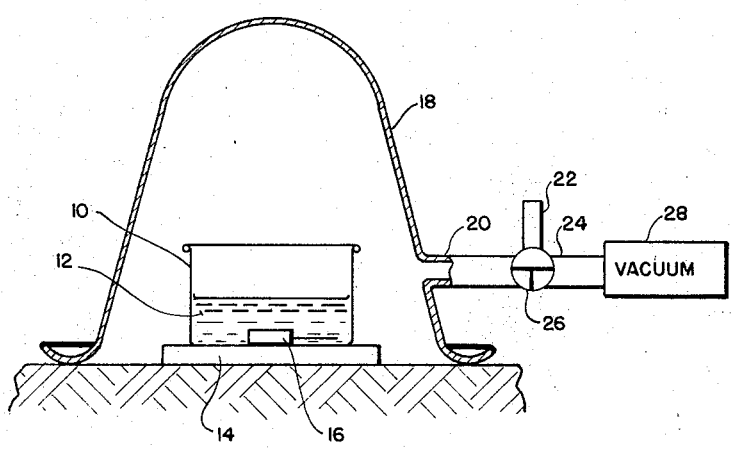
FIG. 1 is a partial section of the preferred form of the apparatus in which the interstices of the porous body of compressed powdered metal are filled with a melted salt of the metal.

Once the compressed powdered silver porous body has been formed, it is then removed from the die and is ready for immersing in a bath of melted silver chloride. For this purpose, as seen in FIG. 1, a beaker 10 is partially filled with silver chloride 12 which is heated by a heating element 14 into a fluid state. The compressed powdered porous body 16 described above is then immersed in the melted silver chloride 12, while the silver chloride is maintained in a fluid condition by the heating element 14. Due to the very wettable characteristic of the melted silver chloride and to capillary forces, the silver chloride will enter the interstices of the porous body 16 driving out the gas filling the interstices. Once the melted silver chloride has completely filled the interstices of the porous body 16 the body is removed from the beaker 10 and left to cool so that the silver chloride may solidify.

The above method is quite satisfactory for forming the electrode component of the invention since silver chloride is wettable and will fill the interstices of the porous body 16. However, not all salts of metals used for electrochemical electrode components of the type to which this invention pertains are sufficiently wettable to completely fill the interstices of the powdered metal porous body 16. Also, the method described above may not be as fast as desired. Thus, according to another embodiment of the invention, after the porous body 16 is completely immersed in the salt bath 12, the entire beaker 10 and heating element 14 are surrounded by an inverted bell jar 18. The bell jar has a port 20 divided into two lines 22 and 24 which are controlled by a three-way valve 26. The line 22 is open to the atmosphere while line 24 is connected to a source of vacuum 28. When the valve 26 is turned to connect the bell jar 18 with the vacuum 28, the bell jar is evacuated and the gas filling the interstices of the porous body 16 is withdrawn therefrom thus leaving completely empty spaces in the porous body. Thereafter, the valve 26 is turned to allow air to enter the bell jar 18, thereby exposing the salt bath 12 to atmospheric pressure. The atmospheric pressure will force the melted silver chloride into the empty interstices of the porous body thereby filling the same very rapidly and completely. The amount of vacuum that is required to perform this method is not critical; however, approximately 50 microns have been used when the salt solution is silver chloride. The only limitation is that, as a practical matter, the vacuum drawn in the bell jar should not be so great as to boil the silver chloride away.

It is generally desired to provide an electrical conductor for the electrode component of the invention. This may be accomplished by first forming the electrode component and then drilling a hole therein into which the electrical conductor may be inserted. This method has the disadvantage that the drill used in providing the hole in the electrode component may contaminate the electrode. Consequently, it is preferred to insert the electrical conductor into the die in which the powdered silver is first compacted to form the porous body 16. Preferably, for a silver-silver chloride electrode component, the electrical conductor is either a silver or platinum wire. This wire should be centrally positioned in the die with the powdered silver being compacted around the wire. This method has the advantage that not only is the electrode component not contaminated by a drill but also it is ensured that the powdered silver particles are in intimate contact with the silver or platinum wire. After the powdered silver is compacted about the wire thus forming an electrode assembly, the assembly is inserted into the salt bath 12 to fill the interstices of the porous silver body with melted silver chloride.

Figure 2:
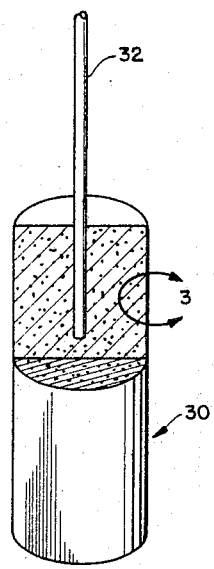
FIG. 2 is an isometric view partially in section of a preferred form of the electrode component of the invention on a somewhat enlarged scale.
Figure 3:
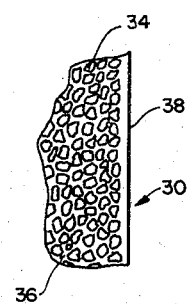
FIG. 3 is a detail of the portion of the electrode component indicated by arrow 3 in FIG. 2.

The completed electrode component of the invention is illustrated in FIG. 2 and is generally designated by numeral 30. The electrode component is illustrated as being cylindrical in shape but obviously any configuration may be used. The electrode component is shown as having mounted therein an electrical conductor 32 which, as described before, may be inserted into the electrode component either after the complete manufacture of the component by drilling a hole for the electrical conductor or by initially inserting the electrical conductor into the die in which the powdered silver is compressed. FIG. 3 shows in detail a section of the electrode component 30 with the powdered silver particles 34 being shown as being compressed together into a unitary body with the spaces between the particles of the silver being filled with molten silver chloride 36 in a solid state. Since the entire porous body 16 is immersed in the salt bath 12, a coating 38 of molten silver chloride will be provided at the surface of the electrode component. Thus, it can be seen that the electrode component of this invention is a completely solid mass and thus is completely nonporous, the porosity only being limited to the extent of the porosity of the metal salt that is used. The electrode is extremely rugged and, since it is nonporous, it is not subject to contamination. Furthermore, it has very high electrical stability and reaches equilibrium in a salt solution very rapidly. If it is desired to have the silver particles exposed to a salt solution, the coating 38 of metal salt may be ground away.

Although several embodiments of the invention have been disclosed herein for purposes of illustration, it will be understood that other applications of the invention are possible and that the embodiments disclosed may be subjected to various changes, modifications and substitutions without necessarily departing from the spirit of the invention as defined by the appended claims.

What is claimed is:

1. An electrode component for the measurement of electromotive force comprising:
    a porous unitary body of a compressed powdered metal; and
    a molten sparingly soluble salt of said metal in solid state filling the interstices of said porous body thereby providing a nonporous electrode component.

2. In an electrode component formed of a metal and a sparingly soluble salt of said metal which will produce an electromotive force when inserted into a solution of salt:
    said metal being a porous unitary body of compressed powder; and
    said salt of the metal being molten and in solid state, said molten salt filling the interstices of said porous body thereby providing a nonporous electrode component.

3. An electrode component as set forth in claim 2 wherein said salt of the metal coats the surface of said unitary body.

4. An electrode component as set forth in claim 2 including an electrical conductor embedded in said unitary body.

5. An electrode component for the measurement of electromotive force comprising:
    a porous unitary body of compressed powdered silver; and
    a molten silver halide in solid state filling the interstices of said porous body thereby providing a nonporous electrode component.

6. An electrode as set forth in claim 5 wherein said silver halide is silver chloride.

7. An electrode component for the measurement of electromotive force comprising:
    a porous unitary body of a compressed powdered metal; and
    said body being completely impregnated with a molten sparingly soluble salt of said metal in solid state thereby providing a nonporous electrode component.

8. A method of making an electrode component for the measurement of electromotive force comprising the steps of:
    compressing a powdered metal into a porous unitary body;
    immersing said porous body into a bath of a melted sparingly soluble salt of said metal until the interstices of said body are filled with said melted salt; and
    removing said body having its interstices filled with said melted salt from said bath.

9. A method of making an electrode component for the measurement of electromotive force comprising the steps of:
    placing a powdered metal in a receptacle;
    inserting an electrical conductor into said powdered metal in said receptacle;
    comprising the powdered metal in said receptacle to form a porous unitary body integral with said conductor;
    immersing said porous body and conductor into a bath of a melted sparingly soluble salt of said metal until the interstices of said body are filled with said melted salt; and
    removing said body and conductor from said bath.

10. A method as set forth in claim 8 wherein said metal is silver and said salt is silver chloride.

11. A method of making an electrode component for the measurement of electromotive force comprising the steps of:
    compressing a powdered metal into a porous unitary body;
    immersing said porous body into a bath of a melted sparingly soluble salt of said metal;
    creating a vacuum about said body while immersed in said bath to withdraw gas from the interstices of said body;
    removing said vacuum so that atmospheric pressure causes the interstices of said body to be filled with said melted salt; and
    removing said body having its interstices filled with melted salt from said bath.

References Cited

UNITED STATES PATENTS

| | | | |
|---|---|---|---|
| 1,711,462 | 4/1929 | Wescott | 136—116 |
| 2,671,955 | 3/1954 | Grubel et al. | 117—114 |
| 2,697,070 | 12/1954 | Arthur | 204—195 |
| 3,111,478 | 11/1963 | Watanabe | 204—195 |
| 3,167,457 | 1/1965 | Bacon et al. | 136—120 |
| 3,282,817 | 11/1966 | Riseman et al. | 204—195.1 |

ROBERT K. MIHALEK, *Primary Examiner.*

JOHN H. MACK, *Examiner.*

T. TUNG, *Assistant Examiner.*

UNITED STATES PATENT OFFICE
CERTIFICATE OF CORRECTION

Patent No. 3,354,069                          November 21, 1967

Paul Jerrold-Jones et al.

It is hereby certified that error appears in the above numbered patent requiring correction and that the said Letters Patent should read as corrected below.

Column 6, line 17, for "comprising" read -- compressing --.

Signed and sealed this 31st day of December 1968.

(SEAL)
Attest:

Edward M. Fletcher, Jr.

Attesting Officer

EDWARD J. BRENNER

Commissioner of Patents